Figure 1:
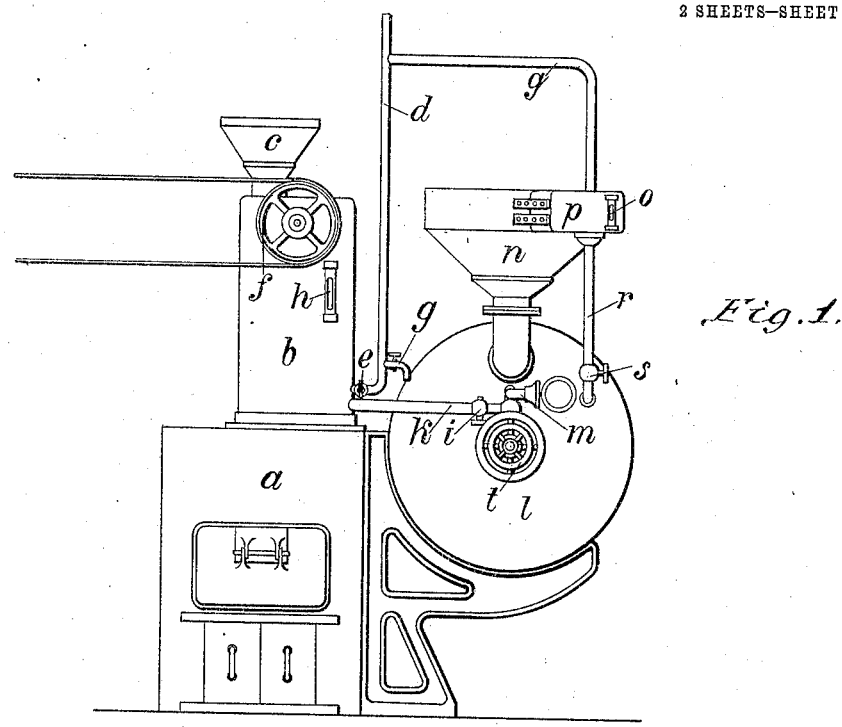

L. KLEIN.
PROCESS OF DECAFFEINATING COFFEE BEANS.
APPLICATION FILED OCT. 5, 1910.

1,039,961.

Patented Oct. 1, 1912.

2 SHEETS—SHEET 1.

Witnesses

Inventor:
Louis Klein
By
Attorney

L. KLEIN.
PROCESS OF DECAFFEINATING COFFEE BEANS.
APPLICATION FILED OCT. 5, 1910.

1,039,961.

Patented Oct. 1, 1912.
2 SHEETS—SHEET 2.

Witnesses.
Kenneth Romanes
E. Beckers Scheins

Inventor.
Louis Klein
By Paul E. Schilling
Attorney

UNITED STATES PATENT OFFICE.

LOUIS KLEIN, OF STRASSBURG, GERMANY.

PROCESS OF DECAFFEINATING COFFEE-BEANS.

1,039,961.  Specification of Letters Patent.  Patented Oct. 1, 1912.

Application filed October 5, 1910. Serial No. 585,514.

*To all whom it may concern:*

Be it known that I, LOUIS KLEIN, a subject of the German Emperor, and residing at Strassburg, Alsace-Lorraine, German Empire, have invented certain new and useful Improvements in Processes of Decaffeinating Coffee-Beans, of which the following is a specification.

The present invention relates to improvements in processes for treating coffee-beans with a view of extracting therefrom the caffein, without in any way injuriously affecting the valuable constituents of the beans.

In the known processes of depriving coffee beans of their caffein, the latter is extracted from the previously steam-heated, loosened-up beans, and after the caffein salts are decomposed into vapor or gas by means of suitable acids or alkalis, by treating them with volatile solvents, such as alcohol, benzol and the like, or mixtures thereof. These procedures, however, are more or less troublesome and time-consuming, requiring also complicated and necessarily expensive apparatus, and are suitable only for working up raw beans, and furthermore the extraction of the caffein can practically not be carried below 0.4%, and at that entails a considerable loss (about 2-2.5%) of those constituents upon which the taste and the aroma depend.

The object of this invention is to provide a process to which the above specified and other disadvantages do not attach, and the process essentially consists in obtaining the caffein extraction without previous decomposition of the caffein-salts, by employing mixtures of two or more alkali caffein solvents, in simple, ordinary apparatus. The technical progress involved in the use of such alkali mixtures over single alkali solutions essentially consists in the possibility of carrying the extraction of the caffein to any desired degree, practically to a percentage of 0.15 and still lower, without at the very most losing more than 1.5-2% of the extraction substances, depending upon the nature of the mixture of alkali solvents used.

I am well aware that it is old to treat raw or roasted beans, in whole or broken state, for the purpose of caffein extraction with a single alkali solvent, for instance lime water or soda solution. But such procedures have the disadvantage that the beans are deprived of all, or at least a large part, of such valuable constituents as tannic acid, viridinic acid and the like, upon which in part the taste and the aroma of the coffee depend, or part of the albuminoids and the fatty constituents are also solved, which constitutents must then, after removal of the caffein, be carried back again to the coffee beans, and furthermore the extraction cannot be carried beyond leaving a caffein percentage of about 0.45%.

A further advantage of my improved process is that it can be carried out without material modification with raw as well as with roasted beans in unbroken state.

As an example of the new process I will now describe it in the treatment of raw or green beans.

Without any pre-treatment 100 kilograms of raw beans are dumped into a pressure boiler, provided with a stirrer, and four to five times as much of a hot alkali mixture, for instance a solution of lime and soda in water, is poured on the charge. This mixture is prepared just previous to use by slaking 10 kilograms of quick lime in 50 liters of water, when slaked lime water results in which slaked lime is still suspended. To this solution is then admixed 1 kilogram of soda-ash. Under constant stirring the mass is then gradually heated to a temperature of about 200° C. by introduction of steam and is kept at this temperature until the beans begin to swell. The evaporating water at first is conducted away by suitable suction means. The beans are now placed into a roaster of ordinary construction and are first dried and then heated to a temperature of 160° C. If necessary the beans are then treated again within the roaster with a fresh charge of lime and soda or other suitable mixture, and the described cycle of operations is repeated until the desired degree of extraction obtains. After the termination of the extraction process proper, which, depending on the properties of the beans treated, may vary from 3-5 hours, the beans are simply washed once or several times for removing the adhering extraction substances; they are next dried and roasted and are then ready for consumption.

Some forms of apparatus suitable for carrying into practice my process and modifications thereof are represented by way of example in the accompanying drawing, wherein:—

Figure 3:
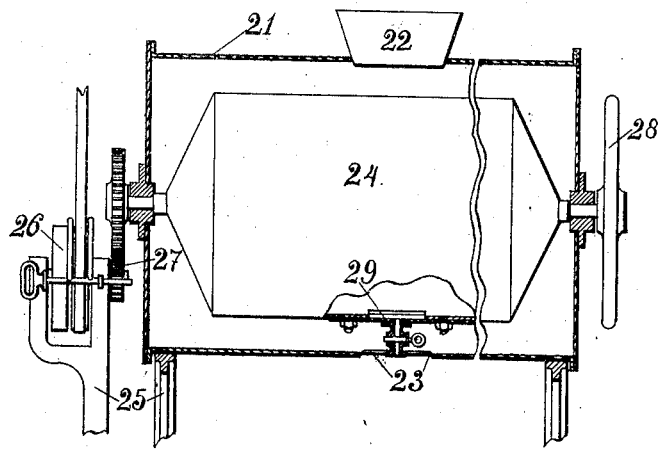
Figure 4:
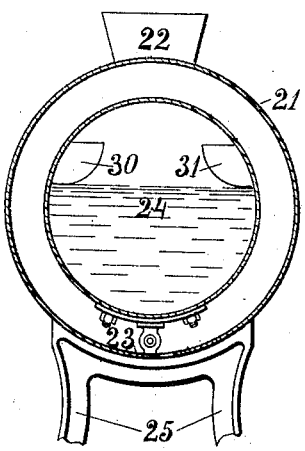
Figure 2:
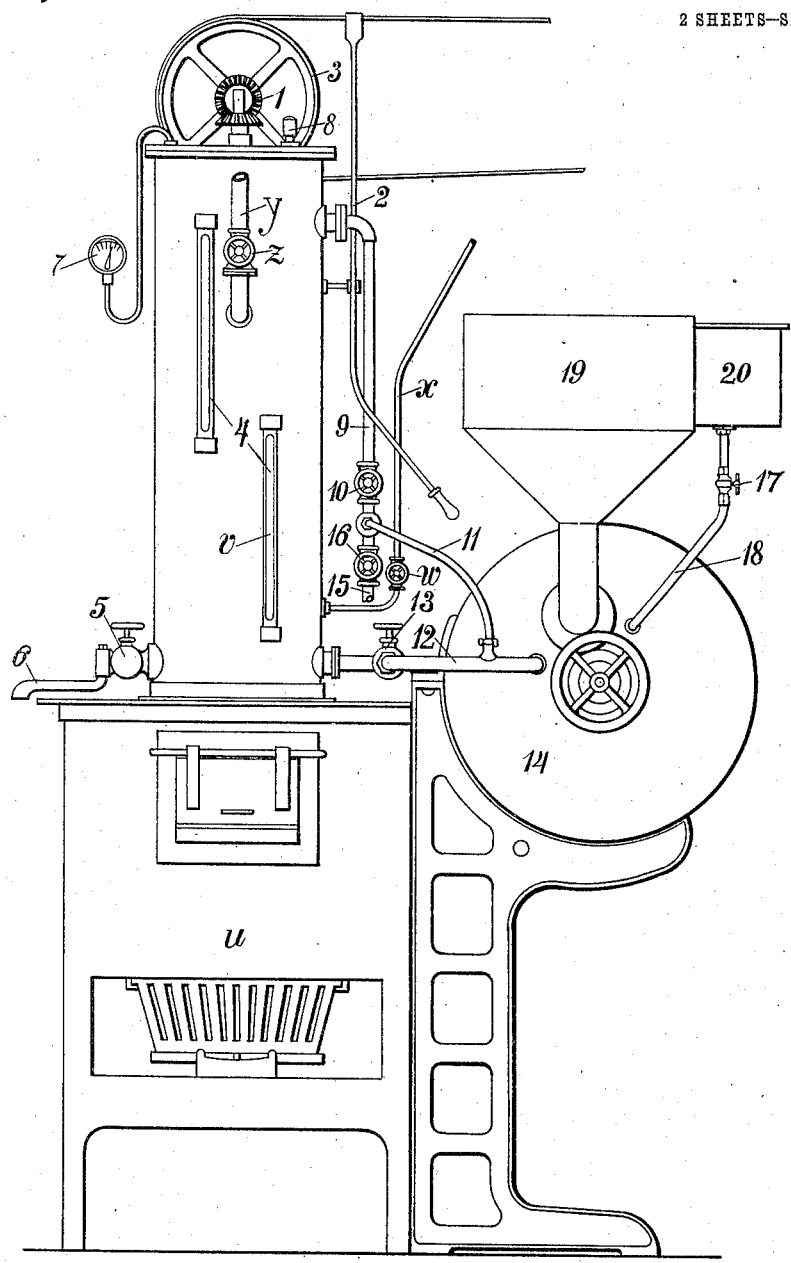

Figure 1 is an elevation showing apparatus suitable for carrying into practice my process as above described; Fig. 2 is a like view of a modified form of apparatus for a modification of my process, while Figs. 3 and 4 are side elevation, partly in section, and transverse section, respectively, showing another form of apparatus for another modification of my process.

Referring firstly to Fig. 1, an important advantage of the apparatus here shown is that it is of very simple construction and can be employed with any existing roasting device. On the furnace $a$, made in known manner, is placed a mixing vessel $b$ which can be heated by the latter, and water requisite for dissolving the chemicals supplied through the hopper $c$ is supplied to this vessel by the pipe $d$ having a stopcock $e$. For preventing these materials settling and for obtaining a uniform mixture I provide in the mixing vessel $b$ a stirrer, not shown, rotated by the belt-driven pulley $f$. The supply pipe $d$ also has at a suitable place a discharge-cock $g$ for preventing water freezing in the pipe in winter, and a gage-glass $h$ is arranged on the mixing vessel itself for determining the level of the liquid. A discharge-pipe $k$, capable of being closed by the cock $i$, leads from the bottom of the mixing vessel to about the center of the jacketed roasting drum $l$ arranged in the illustrative embodiment laterally of the furnace and terminates in a swing discharge-cock $m$ having a nozzle which can be inserted, when desired, into the aperture or peephole provided in the front wall of the drum. As mentioned above, the coffee-beans remain for about an hour at a temperature of about 200° C. in the boiling solution of chemicals in the roasting drum, whereupon the liquid is run off through two openings which are provided in the closed drum and are normally closed by plates which open outwardly automatically, as hereinafter described. After the operation in question has been repeated some few times, cold or hot water is allowed to flow from a tank $p$ into the drum until the coffee is sufficiently washed. In the illustrative embodiment I arrange, to this end, at the hopper $n$ a water tank $p$ which is provided with a gage-glass $o$ and is connected by the pipe $q$ to the water supply pipe $d$. The discharge pipe $r$ of the tank $p$ likewise opens through an opening in the front wall into the roasting drum $l$ and the flow of water is regulated by the stopcock $s$. This apparatus is manipulated very simply as follows: The heated alkali mixture is supplied to the green or preliminarily-roasted beans in the roasting drum from the mixing vessel by turning the revoluble nozzle of the cock $m$ into its hole in the wall of the drum and opening the stopcock $e$. When, owing to continuous heating, the solvent or water is evaporated, by opening the stopcock $s$ fresh water is run into the drum until the chemicals and the like are removed. In the illustrative embodiment the washing water can flow away through the openings provided in the wall of the drum which are closed by plates during the washing operation, the beans being prevented from falling out by perforated plates or the like placed over the openings. These outlets can be opened and closed, for example, by plates operated by the handwheel $t$. The entire solution which runs out of the drum after the coffee-beans have been treated is received in a receptacle in order, if desired, to obtain therefrom the caffein for further employment.

As the above described method of extraction is somewhat troublesome and occupies much time, however, particularly when the removal of the caffein is to be carried as far as possible, I preferably employ the hereinafter-described modification of my process.

The raw, non-disintegrated beans are first softened for 3 to 5 hours according to the kind and origin of the coffee in a cold mixture of alkalis, e. g. slaked lime and soda. After this preliminary treatment the beans are placed into a special roasting drum, or one specially constructed for this purpose, gradually heated to about 180° C., exposed to a current of steam at 2 to 5 atmospheres pressure above atmospheric and then to a hot mixture of alkalis. After again supplying a current of steam, the beans now containing but little caffein are washed and cleaned in the usual manner in fresh water, the attaching particles of the precipitated chemicals and extracted substances being washed away, which operation may be repeated, if desirable. The beans are then roasted partially or completely in a well-known manner. The action of the steam and solvents lasting altogether for 5 to 15 minutes opens the beans still more so that the removal of the caffein can be carried considerably farther, as compared with all processes known heretofore for the same purpose, in spite of the considerable shortening of the time of extraction, without occasioning an increased loss of extracting substances. Further, owing to this rapid extraction the additional advantage is obtained that, in contradistinction to slow methods of extraction, only an exceedingly small quantity of the aromatic constituents of the beans is extracted, so that non-caffeinic coffee obtained in this manner retains the flavor and aroma of ordinary coffee. This modification of the process forming the subject-matter of my invention obviously necessitates a modification of the apparatus requisite for carrying the same into practice consisting substantially in the mixing vessel, used for producing the hot solution of the extracting agent, being simultaneously formed as a vaporizer, so that the alternate treatment of the coffee-beans with steam and solvents, e. g. during the preliminary roasting process, can take place very rapidly.

Fig. 2 shows apparatus for carrying into practice the above described modified process of obtaining coffee beans free from caffein. The apparatus comprises a mixing vessel $v$ on the furnace $u$ which in large roasters is generally arranged laterally of the roaster; fresh water is supplied to the vessel $v$ through the pipe $x$ having the stopcock $w$, and the chemicals for the extraction of the caffein through the pipe $y$ having the stopcock $z$. Inside the mixing vessel $v$ is a stirrer, not shown, rotated by bevel-wheel gearing 1 driven by a pair of belt pulleys 3 able to be influenced by a belt-shifter 2. Two gage-glasses 4 are provided on the mixing vessel for supervising the level of the liquid therein, and a bib-cock 5 having a swing nozzle 6 is provided at the bottom of the vessel $v$ for running off the liquid if necessary. In order to employ the mixing vessel simultaneously as a steam generator it is only filled with water to the top mark of the higher gage-glass. The pressure of the steam forming when the vessel is heated is read on a manometer 7 of known kind provided on the vessel, while a safety valve 8 of known kind is provided for preventing explosion. A pipe 9 dividing below a stopcock 10 into two branch pipes 11, is connected with the top of the mixing and evaporating vessel $v$ for conducting away the steam which is produced at a pressure of 2 to 5 atmospheres above atmospheric. These branches open into two pipes 12, each having a stopcock 13, connected to the two ends of the drum 14 and to the bottom of the mixing vessel and serve for supplying steam and solvent to the roasting drum 14 where they act on the beans which have been previously treated if necessary. For the purpose of leading the steam away into the open air when the action of steam is not necessary, a branch pipe 15, having a stopcock 16, is connected to the main pipe 9. Further, for supplying fresh water to the drum 14, a pipe 18, having a stopcock 17, and fed from a fresh water tank 20 mounted on the hopper 19 of the roasting apparatus, opens into the front and, if desired, into the rear wall of the drum. This modified form of my apparatus is used as follows:—After the solvent, e. g. water, and the chemicals, e. g. caustic lime and soda, have been supplied to the mixing vessel $v$ through the pipes $x$ and $y$ the stirrer is started by operating the belt-shifter 2 and the entire contents of the vessel $v$ is heated to about 150 to 180° C. As soon as the requisite pressure of steam is obtained and the coffee-beans, treated preliminarily, if necessary, have been fed in the meantime into the roasting drum through the hopper 19 and heated to about 180° C., by opening the stopcock 10 steam is supplied through the two branches 11 to the feed pipes 12, enters into the drum 14 and acts on the beans. After some minutes the stopcocks 13 of the pipes 12 are opened and the necessary quantity of the solvent of caffein is supplied from the mixing vessel $v$ into the roasting drum. After closing the said stopcocks 13 steam is again supplied through the steam pipe 9, whereupon this pipe is again closed by turning the stopcock 10. By opening the stopcock 17 fresh water is then supplied through the pipe 18 from the tank 20 to the beans thus treated, whereby the beans are purified and particles of chemical and other origin adhering to them are washed away. After the washing operation has terminated in the desired manner the beans are roasted completely in the usual manner.

The above described modes of obtaining coffee-beans free from caffein by means of an alkaline mixture are limited inasmuch as, on the one hand, when the beans are treated at a moderate temperature the caffein can be extracted only to a certain degree and, on the other hand, when higher temperatures are used with the action of steam although the extraction of the caffein is more perfect, the substances which are very important for the taste of the finished product are simultaneously extracted to an undesirable extent. The purpose of another modification of my process is to remedy this defect. This modification substantially consists in treating the beans by means of an alkaline mixture at a very moderate temperature and employing the pressure of a gas produced by suitable chemicals. To this end, the beans are softened in the usual manner in a solution of alkalis or the like, but are subsequently exposed to the action of gases, as e. g. carbon dioxid, which are non-injurious to the beans and by the addition of suitable chemicals, as e. g. sodium carbonate and potassium tartrate, produce in the extraction liquid the pressure requisite for the further extraction of the caffein. In this manner the extraction can be continued until a residue of about 0.181% remains when the maximum loss of extracting substances (1.5%) remains the same. For economically carrying into practice this modification of my process any desired roasting drum may be employed, but I prefer to carry this process into practice in a device independent of the roasting drum, such as is represented in Figs. 3 and 4. Referring to these figures, a drum 24 forming the extraction vessel proper is revoluble in the ends of a drum-like vessel 21 provided with a preferably detachable hopper 22 and an outlet 23. This drum 24 is driven in known manner by belt-driven spur gearing 26, 27 mounted on the frame 25 and can also be rotated by hand by a hand-wheel 28 provided at the opposite end. Obviously this hand-wheel is necessary when the inlet of the drum 24, which is closed by a cover 29, having a cock, by means of screws or pivotal screw-bolts, is not under the hopper 22. Further, inside the drum 24 are one or more pockets 30, 31 for holding the chemicals necessary for generating a gas and so placed that their contents do not come into contact with the extraction liquid at the beginning of the process. This process is used as follows:—After the beans have been placed into the drum 24 and have softened sufficiently long in the extraction liquid therein a suitable quantity of the chemicals, such as e. g. sodium bicarbonate and potassium tartrate, for generating the gas is put into the two pockets 30, 31. When the drum 24 is started rotating these substances fall out of the pockets into the extraction liquid. The dissolving chemicals act on one another and generate a gas, in the supposed case carbon dioxid, which, as experiments have shown, increases the extraction of the caffein, owing to the pressure produced, to such an extent that after the beans have been treated altogether for 3 to 5 hours the percentage of caffein in the same amounts, as mentioned above, to only 0.181%.

I claim:—

1. The hereindescribed process of decaffeinating coffee beans, which consists in subjecting the beans to the action of liquid alkali mixtures capable of dissolving caffein, substantially as set forth.

2. The hereindescribed process of decaffeinating coffee beans, which consists in subjecting the beans to the action of a mixture of a plurality of alkali solutions capable of dissolving caffein, substantially as set forth.

3. The hereindescribed process of decaffeinating coffee beans, which consists in subjecting the beans to the action of alkali mixtures and of pressure gases capable of dissolving caffein, substantially as set forth.

4. The hereindescribed process of decaffeinating coffee beans, which consists in subjecting the beans to the action of alkali mixtures capable of dissolving caffein and of pressure gases generated by causing suitable agents to react with said alkali mixtures, substantially as set forth.

5. The hereindescribed process of decaffeinating coffee beans, which consists in subjecting the beans to the action of liquid alkali mixtures capable of dissolving caffein until the beans swell up, drying them, repeating the operations as required, washing the product, and then roasting it, substantially as set forth.

6. The hereindescribed process of decaffeinating coffee beans, which consists in soaking the beans in cold liquid alkali mixtures capable of dissolving caffein, steaming the beans, subjecting them to the action of hot alkali mixtures, then washing, and finally roasting them, substantially as set forth.

In testimony whereof I affix my signature in presence of two witnesses.

LOUIS KLEIN.

Witnesses:
 JON BALE,
 AUGUST OOSTERMAN.